US007604854B2

(12) United States Patent
Jarvis et al.

(10) Patent No.: US 7,604,854 B2
(45) **Date of Patent: *Oct. 20, 2009**

(54) BUSINESS FORM

(75) Inventors: Steve Jarvis, Swanton, VT (US); Ken Whitcomb, Franklin, VT (US); Eric Severy, Georgia, VT (US)

(73) Assignee: Bertek Systems, Inc., Swanton, VT (US)

( * ) Notice: Subject to any disclaimer, the term of this patent is extended or adjusted under 35 U.S.C. 154(b) by 390 days.

This patent is subject to a terminal disclaimer.

(21) Appl. No.: 10/453,061

(22) Filed: Jun. 3, 2003

(65) Prior Publication Data

US 2003/0207063 A1 Nov. 6, 2003

Related U.S. Application Data

(63) Continuation-in-part of application No. 09/911,362, filed on Jul. 23, 2001, now Pat. No. 6,572,151.

(51) Int. Cl.
*B32B 9/00* (2006.01)
*B32B 33/00* (2006.01)
*B32B 23/02* (2006.01)

(52) U.S. Cl. .................... 428/40.1; 428/41.3; 428/41.5; 428/192; 428/194

(58) Field of Classification Search ................ 428/40.1, 428/41.3, 41.5, 41.7, 42.1, 192, 194; 283/81, 283/101
See application file for complete search history.

(56) References Cited

U.S. PATENT DOCUMENTS

| | | | | |
|---|---|---|---|---|
| 3,111,449 A | | 11/1963 | Gold et al. | |
| 4,475,830 A | | 10/1984 | Schaefer | |
| 4,545,517 A | | 10/1985 | Olson | |
| 4,568,108 A | | 2/1986 | Simpson | |
| 4,627,994 A | | 12/1986 | Welsch | |
| 4,696,843 A | | 9/1987 | Schmidt | |
| 4,865,669 A | | 9/1989 | Schmidt | |
| 4,999,334 A | * | 3/1991 | Mehta et al. | 503/226 |
| 5,006,191 A | | 4/1991 | Schmidt | |
| RE33,616 E | | 6/1991 | Welsch | |
| 5,135,789 A | | 8/1992 | Schmidt | |
| 5,254,381 A | | 10/1993 | Hoffmann et al. | |
| 5,418,026 A | * | 5/1995 | Dronzek et al. | 428/41.4 |
| 5,642,906 A | | 7/1997 | Foote et al. | |
| 5,855,395 A | | 1/1999 | Foote et al. | |
| 6,572,151 B2 | * | 6/2003 | Jarvis et al. | 283/101 |

* cited by examiner

*Primary Examiner*—Patricia L Nordmeyer
(74) *Attorney, Agent, or Firm*—Hahn Loeser & Parks LLP

(57) ABSTRACT

A business form with a moisture transport accelerating and stabilizing coating for improving the transport of moisture through paper stock during printing in a laser printing. The coating improves the resistance of the paper to curling when heated in a laser printer and reduces the likelihood of paper jams, especially during duplex printing.

9 Claims, 3 Drawing Sheets

BUSINESS FORM

This application is a continuation-in-part of application Ser. No. 09/911,362, now U.S. Pat. No. 6,572,151 Jul. 23, 2001, the disclosure of which is hereby incorporated by reference.

BACKGROUND OF THE INVENTION

This invention relates to a coating for paper, and more particularly, to a moisture transport accelerator and stabilizer coating for a label/form combination that is designed to allow the label/form combination to withstand the harsh environment of a laser printer during both simplex and duplex imaging processes.

One problem inherent in label/form construction is found in association with duplex imaging. For duplex printing in a laser printer, two passes through the fuser are made. The higher temperatures and increased dwell times can cause curling of the label/form combination, which can result in the label/form jamming the printer. This may be particularly problematic with respect to the use of short grain designed products where the bond paper is in a short grain direction in the printer. In the duplex imaging mode, the sheet needs to pass through the fuser twice, and significant temperatures can be generated. This can result in rapid loss of moisture by the heated sheet after its first pass through the fuser. Moisture gained in the bond portion of the structure escapes rapidly, causing the short grain sheet to curl and jam in the feed path, particularly in high humidity environments, where it may have absorbed additional moisture.

It is therefore an object of this invention to set forth a label/form combination assembly, which avoids the disadvantages and previously mentioned limitations of typical current document assemblies.

SUMMARY OF THE INVENTION

In one aspect of the present invention, this is accomplished by providing a business form comprising: a sheet of laser printable stock; and a moisture transport accelerating and stabilizing coating on at least a portion of at least one side of the sheet of laser printable stock.

The foregoing and other aspects will become apparent from the following detailed description of the invention when considered in conjunction with the accompanying drawing figures.

BRIEF DESCRIPTION OF THE INVENTION

DESCRIPTION OF THE PREFERRED EMBODIMENTS

Figure 1:
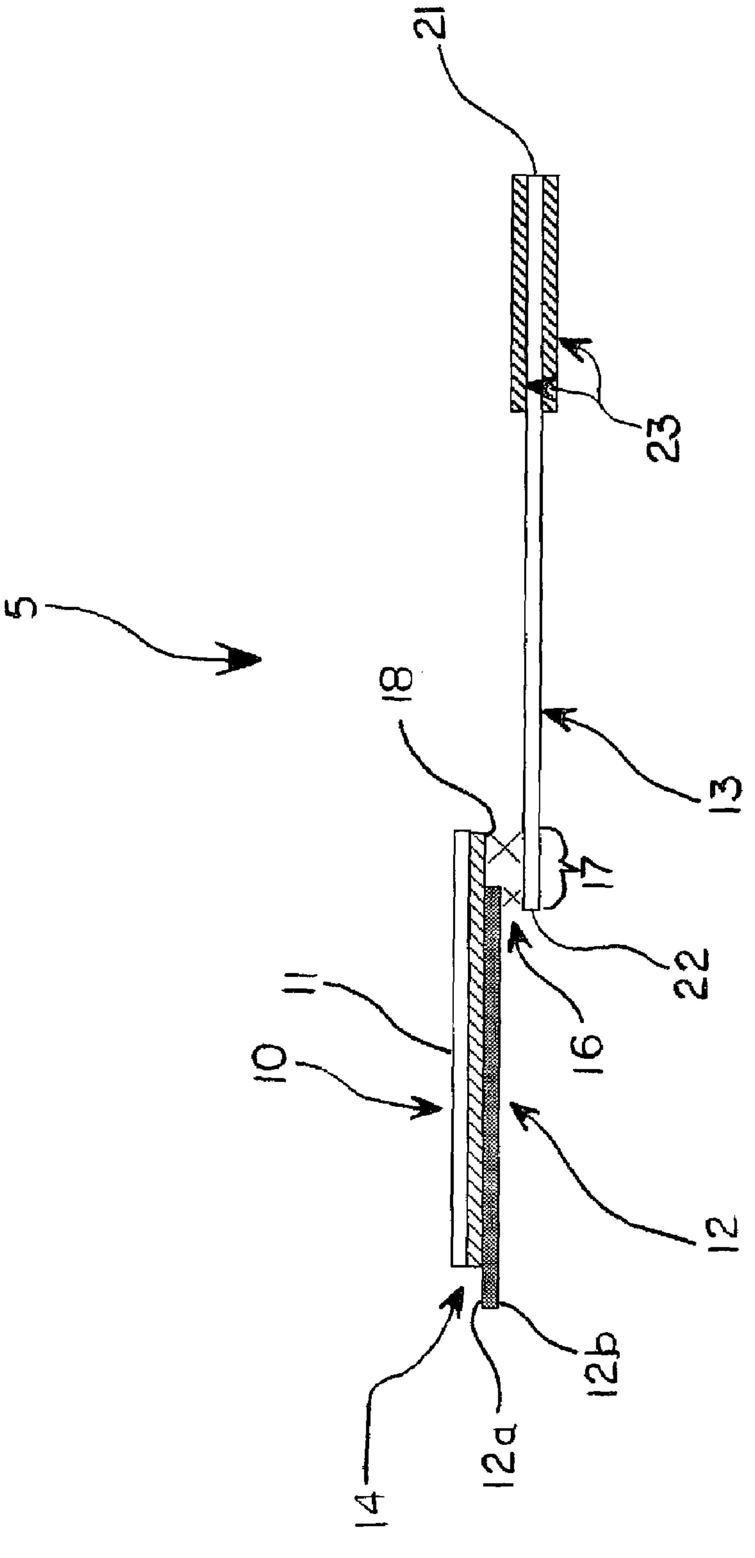
FIG. 1 is a schematic side view of the preferred embodiment of the completed construction of the label/form combination assembly.
Figure 1A:
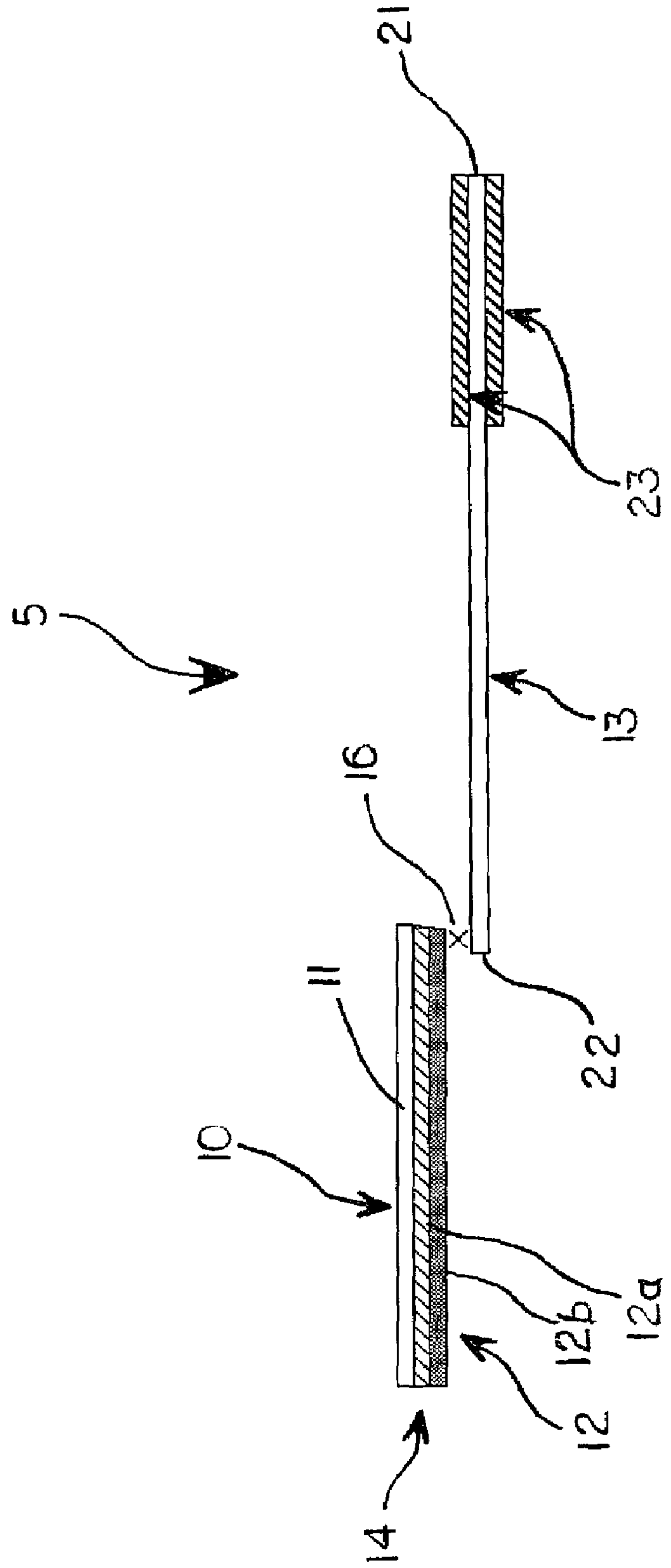
FIG. 1A is a schematic side view of an alternate embodiment of the completed construction of the label/form combination assembly.
Figure 2:
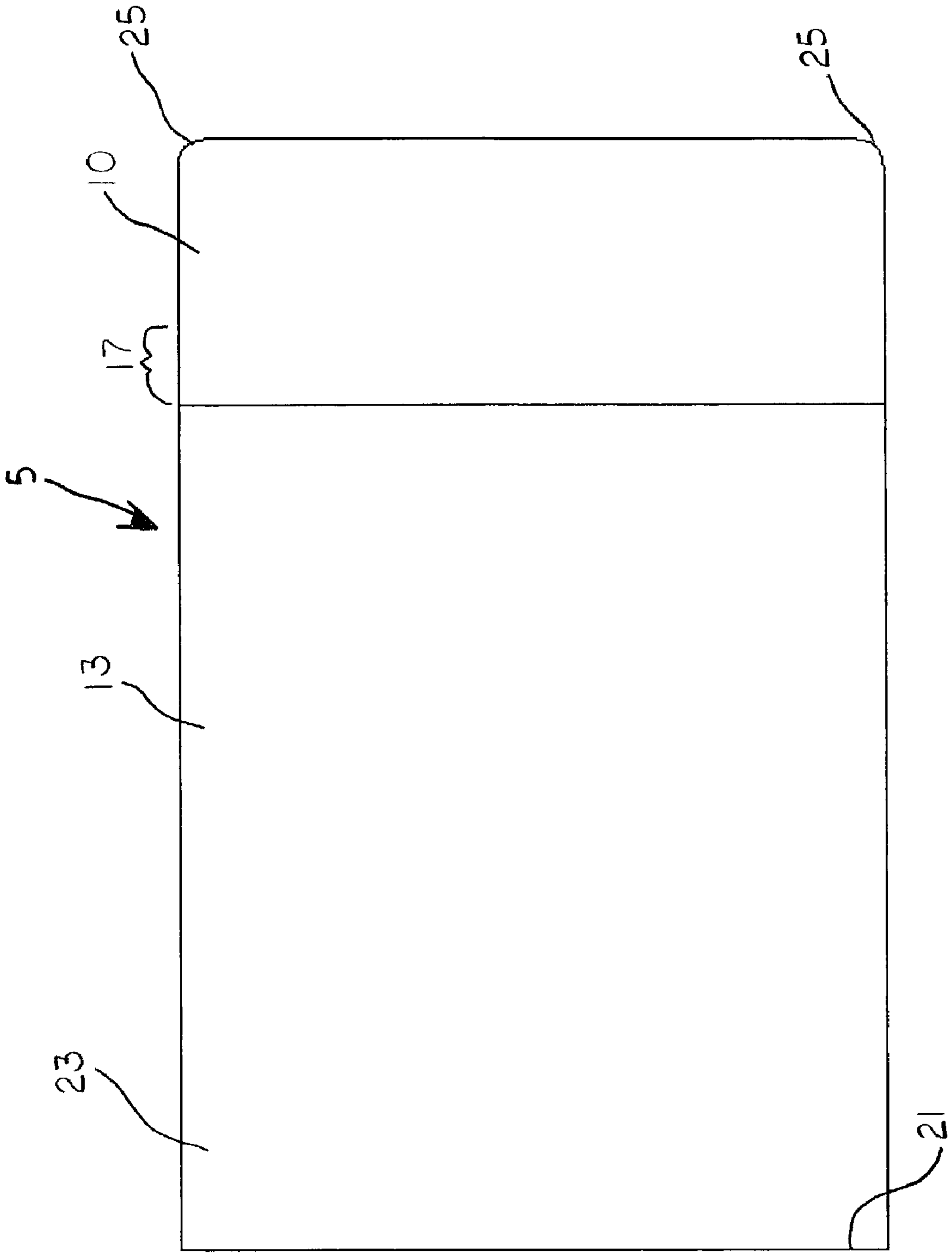
FIG. 2 is a plan view of the label/form combination assembly shown in FIG. 1.

As shown in the FIGURES, a business form 5 according to an embodiment of the invention is comprised of a releasable label sheet 10 joined with a laser printable sheet 13. Preferably, the laser printable sheet 13 is a short grain bond paper. The releasable label sheet 10 includes label stock 11 with a coating of pressure sensitive adhesive 14 on one side and a release stock 12 having a release coating 12*a* on the side engaging the pressure sensitive adhesive 14. In a preferred embodiment, the non-coated side 12*b* of the release stock 12 is capable of being printed by a laser printer. The pressure sensitive adhesive 14 along one edge of the label stock 11 is left exposed, shown at 18. A strip of cold bond adhesive 16 is applied to the non-coated side 12*b* of the release stock 12 adjacent the exposed pressure sensitive adhesive 18. The cold bond adhesive 16 has characteristics to allow appropriate bonding between the sheets while not being subject to losing or altering the bonding characteristics when heat is applied in the printing process at the fusing station, either in simplex or duplex imaging. The preferred cold bond adhesive is a solventless, aqueous adhesive. A leading edge 22 of the laser printable sheet 13 is joined with the releasable label sheet 11 by both the applied cold bond adhesive 16 and the exposed pressure sensitive adhesive 18 at an overlap area 17.

Joining the releasable label stock 11 and the laser printable sheet 13 in this manner yields two results: a thinner joint and a firmly anchored joint for simplex or duplex printing. Although the construction is effective in simplex printing, many of the advantages of the construction are particularly suited for duplex imaging. As previously explained, another problem associated with duplex printing, particularly with short grain paper, is curl. In duplex printing, the form needs to pass through the fuser twice. What commonly happens, especially in a high humidity environment, is the tendency for the form to curl after the first pass through the fuser. Moisture gained in the bond paper portion of the form escapes rapidly causing the short grain sheet to curl and jam in the feed path. To overcome this problem, a portion of the laser printable sheet 13 may be coated with a UV curable moisture transport accelerator and stabilizing coating 23 proximate a trailing edge 21 of the laser printable sheet 13. This coating 23 is applied to at least one side of the laser printable paper 13 at its trailing edge 21 and preferably to both the face and the back of the laser printable paper 13. There is no limit as to how much of the paper sheet can be coated. The entire laser printable sheet 13 can be coated with the moisture transport accelerator and stabilizing coating 23. However, it is preferable that only a portion of the laser printable sheet 13 proximate the trailing edge 21 is coated. After the laser printable sheet 13 is coated with coating 23, the coating is exposed to ultraviolet (UV) light to cure coating 23.

Bond laser paper is designed to remain flat during its use in a laser printer. In a normal simplex imaging scenario, even a laser bond sheet will rapidly lose moisture as it is processed through a laser printer—which explains why some sheets curl after being imaged just once in the simplex mode. In a duplex mode, a standard laser bond that is short grain will curl as moisture is rapidly lost during its first fusing process. The coating 23 allows the sheet (at the area coated) to gain moisture at a more rapid rate after it has been exposed to the high heat of the fusing process of the first pass. What happens is the trailing edge 21 (which becomes the leading edge on the second pass) reaches equilibrium (flatness) faster than paper that has not been coated. In essence, the coating 23 acts as an accelerator for moisture gain in the sheet which allows the sheet to rapidly gain moisture back and thus achieve equilibrium (flatness) which allows it to process trouble-free through the next fusing stage of the duplex process.

The moisture transport accelerator and stabilizing coating 23 is a UV (ultraviolet) cured primer comprised of a mixture of:

hexanediol diacrylate, a low viscosity, low volatility difunctional monomer having a hydrophobic backbone, Ebecryl® 600 by UCB Chemicals, an acrylated epoxy oligomer, specifically bisphenol-A epoxy diacrylate, trimethylolpropane triacrylate, a low viscosity, low volatility trifunctional liquid monomer, and Irgacure® 651 by Ciba Specialty Chemicals Inc., a UV curable solid free-radical photoinitiator, specifically 2,2-dimethoxy-1,2-diphenylethan-1-one.

The UV primer 23 seals the fibers of the paper in the area primed without increasing the fiber thickness. This coating 23 prevents the absorption of moisture into the fibers yielding very open pores in the primed portion of the paper that allows quick passage of moisture through the paper.

If the primed surface is exposed to moisture, there is an initial curl toward the unexposed side of the paper; however, the coated paper fibers do not swell and moisture is quickly transported through the open pores of the paper. This results in an elevated state of equilibrium between the moisture and the paper and the curl quickly disappears—returning the paper to its original, flat state.

In comparison, a non-primed paper, when exposed to moisture, absorbs the moisture more slowly. This is due to the paper fibers swelling as they absorb moisture, thus causing the paper's pores to contract and consequently slowing the moisture passage through the paper. If moisture is exposed to the non-primed paper, the paper curls toward the unexposed side of the paper. Since the non-primed paper fibers swell, causing the pores to contract, moisture is slowly transported through the pores of the paper. The result is that equilibrium is achieved after a much longer time period compared to paper that has been primed with the UV coating 23.

In the process of imaging a primed sheet of paper through a duplex laser printer, moisture in the paper is rapidly lost after being exposed to the elevated temperatures present in the fusing station. This rapid loss of moisture causes the paper to curl. As the sheet exits the fuser, the primer 23 allows moisture to be rapidly gained back into the primed sheet and achieve equilibrium—layflatness. This allows the sheet to continue on its process of entering the second imaging phase of duplex imaging.

The form 5 of the present invention is better suited for duplex printing in that the joint is more streamline for ease of feeding through the laser printer and the primary bond (cold glue) is resistant to the heat generated by the laser printer and therefore reduces the risk of the combined label/form failing apart at the joint. Further, the construction of this new joint may also be used for duplex printing with removable labels on both sides. The moisture transport accelerating and stabilizing coating 23 at the trailing edge of the laser printable paper 13 provides the dimensional stability required for trouble-free feeding through the paper path of the printer in a variety of printing environments, particularly high humidity conditions.

In addition to being used with label/form combinations, the moisture accelerating and stabilizing coating 23 can be used with other forms, both duplex and simplex, that are susceptible to curling during printing in a laser printer.

While the invention has been described in connection with specific embodiments thereof, it is clearly to be understood that this is done only by way of example and not as a limitation to the scope of the invention as set forth in the objects thereof and in the appended claims.

What is claimed is:

1. A business form comprising:

a releasable label sheet comprising a label stock having one side coated with pressure sensitive adhesive and a release stock having one side coated with a release agent, the pressure sensitive adhesive engaging the release stock coated surface;

a laser printable sheet adhesively connected to the label sheet; and means for accelerating and stabilizing moisture transport on the laser printable sheet.

2. The business form according to claim 1, wherein the laser printable sheet is duplex laser printable stock capable of being printed on both sides.

3. The business form according to claim 1, wherein the laser printable sheet has a trailing edge and a leading edge, the means for accelerating and stabilizing moisture transport comprising a UV curable primer extending from proximate the trailing edge towards the leading edge.

4. The business form according to claim 3, wherein the UV curable primer comprises:

a curable carrier agent;

at least one curable monomer; and a UV activated photoinitiator.

5. The business form according to claim 1, wherein the means for accelerating and stabilizing moisture transport comprises a mixture of hexanediol diacrylate, bisphenol A epoxy diacrylate, trimethylolpropane triacrylate and 2,2-dimethoxy-1,2-diphenylethan-1-one.

6. A duplex business form comprising:

a releasable label sheet comprising a label stock cut into one or more sections and having one side coated with pressure sensitive adhesive and a release stock having one side coated with a release agent, the pressure sensitive adhesive engaging the release stock coated surface;

a laser printable sheet adhesively connected to the label sheet, the laser printable sheet having a trailing edge and a leading edge, the leading edge being adhesively attached to the label sheet; and a moisture transport accelerating and stabilizing coating on at least one surface of the laser printable sheet extending from proximate the laser printable sheet trailing edge towards the laser printable sheet leading edge.

7. The business form according to claim 6, wherein the moisture transport accelerating and stabilizing coating comprises:

a curable carrier agent;

at least one curable monomer; and a UV activated photoinitiator.

8. The business form according to claim 6, wherein the release stock non-coated side comprises a printable surface and the laser printable sheet is capable of being printed on both sides.

9. The business form according to claim 6, wherein the moisture transport accelerating and stabilizing coating comprises a mixture of hexanediol diacrylate, bisphenol A epoxy diacrylate, trimethylolpropane triacrylate and 2,2-dimethoxy-1,2-diphenylethan-1-one.

* * * * *